United States Patent
Li et al.

(10) Patent No.: US 11,843,263 B2
(45) Date of Patent: Dec. 12, 2023

(54) CHARGING SYSTEM, FOREIGN OBJECT DETECTION METHOD AND COMPONENT, CHARGING CONTROL METHOD AND DEVICE

(71) Applicant: BOE TECHNOLOGY GROUP CO., LTD., Beijing (CN)

(72) Inventors: Zhichao Li, Beijing (CN); Tianyue Zhao, Beijing (CN); Xianzhen Li, Beijing (CN); Enhui Guan, Beijing (CN); Tianxiao Zhao, Beijing (CN); Wei Deng, Beijing (CN); Donglei Mu, Beijing (CN); Masakazu Okamura, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 727 days.

(21) Appl. No.: 17/043,266

(22) PCT Filed: Apr. 27, 2020

(86) PCT No.: PCT/CN2020/087321
§ 371 (c)(1),
(2) Date: Sep. 29, 2020

(87) PCT Pub. No.: WO2020/228526
PCT Pub. Date: Nov. 19, 2020

(65) Prior Publication Data
US 2023/0103921 A1   Apr. 6, 2023

(30) Foreign Application Priority Data

May 16, 2019   (CN) .......................... 201910406482.3

(51) Int. Cl.
*H02J 50/00*   (2016.01)
*H02J 50/60*   (2016.01)
(Continued)

(52) U.S. Cl.
CPC .............. *H02J 50/60* (2016.02); *G01V 3/104* (2013.01); *H02J 50/12* (2016.02)

(58) Field of Classification Search
CPC .. H02J 50/60; H02J 50/12; H02J 50/80; H02J 7/00034; G01V 3/104; G01V 3/10
See application file for complete search history.

(56) References Cited

U.S. PATENT DOCUMENTS 9,709,690 B2 *   7/2017   Arisawa ............. G01R 19/0084
9,712,001 B2     7/2017   Nakano et al.
(Continued)

FOREIGN PATENT DOCUMENTS

BR   102015029388 A2 *   8/2017   .............. B60L 3/003
CN   103368277 A   10/2013
(Continued)

OTHER PUBLICATIONS

International Search Report and Written Opinion for International Application No. PCT/CN2020/087321 dated Aug. 3, 2020.
(Continued)

*Primary Examiner* — Naum Levin
(74) *Attorney, Agent, or Firm* — Perilla Knox & Hildebrandt LLP; Kenneth A. Knox

(57) ABSTRACT

The present disclosure relates to a charging system, a foreign object detection method and component, and a charging control method and device, which belong to the wireless technical field. The foreign object detection method includes receiving a voltage value and a current value of the transmitting coil, and determining a mutual inductance value of the transmitting coil according to the voltage value and the current value of the transmitting coil; receiving a voltage value and a current value of the receiving coil, and determining a mutual inductance value of the receiving coil according to the voltage value and the current value of the (Continued)

receiving coil; and determining whether there is a conductor foreign object between the receiving coil and the transmitting coil according to the mutual inductance value of the transmitting coil and the mutual inductance value of the receiving coil.

15 Claims, 6 Drawing Sheets

(51) Int. Cl.
*G01V 3/10* (2006.01)
*H02J 50/12* (2016.01)

(56) References Cited

U.S. PATENT DOCUMENTS

| | | | |
|---|---|---|---|
| 9,726,518 | B2 * | 8/2017 | Widmer .................. B60L 3/04 |
| 9,929,605 | B2 | 3/2018 | Nakano et al. |
| 10,020,693 | B2 | 7/2018 | Nakano et al. |
| 10,566,849 | B2 | 2/2020 | Nakano et al. |
| 10,651,658 | B2 * | 5/2020 | Yamamoto ............ G01V 3/101 |
| 10,862,336 | B2 * | 12/2020 | Obayashi ............ B60L 53/122 |
| 10,938,252 | B2 * | 3/2021 | Smith .................... H02J 50/12 |
| 11,002,874 | B2 * | 5/2021 | Widmer ............... B60L 53/122 |
| 11,088,573 | B2 * | 8/2021 | Kondo .................. H02J 50/60 |
| 11,175,428 | B2 * | 11/2021 | Oshima ................. H02J 50/80 |
| 11,565,596 | B2 * | 1/2023 | Widmer ................ G01V 9/005 |
| 2009/0079387 | A1 * | 3/2009 | Jin ......................... H02J 50/70 320/108 |
| 2013/0307346 | A1 * | 11/2013 | Arisawa ................. H02J 50/12 307/104 |
| 2015/0171633 | A1 | 6/2015 | Nakano et al. |
| 2016/0218567 | A1 | 7/2016 | Nakano et al. |
| 2018/0006505 | A1 | 1/2018 | Nakano et al. |
| 2018/0294679 | A1 | 10/2018 | Nakano et al. |
| 2019/0074730 | A1 | 3/2019 | Shahsavari et al. |
| 2021/0215845 | A1 * | 7/2021 | Tejeda .................... G01V 3/10 |

FOREIGN PATENT DOCUMENTS

| | | | | |
|---|---|---|---|---|
| CN | 103427496 | A | | 12/2013 |
| CN | 103852631 | A | | 6/2014 |
| CN | 104242477 | A | | 12/2014 |
| CN | 104365028 | A | | 2/2015 |
| CN | 105144546 | A | | 12/2015 |
| CN | 105334539 | A | | 2/2016 |
| CN | 105474511 | A | | 4/2016 |
| CN | 105594098 | A | | 5/2016 |
| CN | 106410978 | A | | 2/2017 |
| CN | 106471381 | A * | 3/2017 | ............ G01V 3/10 |
| CN | 106685029 | A | | 5/2017 |
| CN | 103308948 | B | | 6/2017 |
| CN | 106972651 | A | | 7/2017 |
| CN | 107248788 | A | | 10/2017 |
| CN | 107947395 | A | | 4/2018 |
| CN | 108051864 | A | | 5/2018 |
| CN | 108173359 | A | | 6/2018 |
| CN | 105334539 | B | | 9/2018 |
| CN | 108964295 | A | | 12/2018 |
| CN | 109143383 | A | | 1/2019 |
| CN | 110146927 | A | | 8/2019 |
| DE | 102016217703 | A1 * | 3/2018 | |
| EP | 2865101 | A1 | | 4/2015 |
| EP | 3050738 | A1 | | 8/2016 |
| EP | 3032687 | B1 * | 11/2017 | ............ H02J 5/005 |
| EP | 3373461 | A1 | | 9/2018 |
| EP | 3379735 | A1 | | 9/2018 |
| EP | 2865101 | B1 | | 11/2018 |
| EP | 3373461 | B1 | | 10/2019 |
| EP | 3379735 | B1 | | 1/2020 |
| EP | 3605855 | A1 | | 2/2020 |
| EP | 3651374 | A1 | | 5/2020 |
| EP | 3426517 | B1 * | 9/2022 | ........... B60L 11/182 |
| JP | 2009106126 | A * | 5/2009 | |
| JP | 2009124878 | A * | 6/2009 | ............ H01F 38/14 |
| JP | 2011072115 | A | | 4/2011 |
| JP | 2012065477 | A * | 3/2012 | |
| JP | 2012143091 | A * | 7/2012 | ............ H02J 17/00 |
| JP | 2013219945 | A * | 10/2013 | ........... G01D 5/2006 |
| JP | 2015095905 | A | | 5/2015 |
| JP | 2015223009 | A | | 12/2015 |
| JP | 2019047675 | A * | 3/2019 | |
| TW | 201206015 | A * | 2/2012 | ............ H02J 50/12 |
| WO | WO-2009063975 | A9 * | 2/2012 | ............ H01F 38/14 |
| WO | 2013190809 | A1 | | 12/2013 |
| WO | 2014041863 | A1 | | 3/2014 |
| WO | 2015037291 | A1 | | 3/2015 |
| WO | WO-2019021655 | A1 * | 1/2019 | ............... B60L 5/00 |
| WO | WO-2019219208 | A1 * | 11/2019 | ............ G01V 3/10 |
| WO | 2020052023 | A1 | | 3/2020 |

OTHER PUBLICATIONS

First Office Action for CN Patent Application No. 201910406482.3 dated Aug. 28, 2020.

* cited by examiner

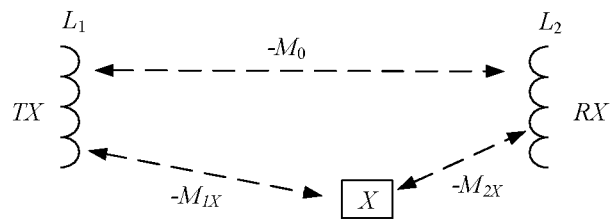

FIG. 6

| Under a reference condition, receive the voltage value and the current value of the transmitting coil, and determine a reference mutual inductance value of the transmitting coil according to the voltage value and the current value of the transmitting coil | ⟶ S310 |

|
| Under the reference condition, receive the voltage value and the current value of the receiving coil, and determine a reference mutual inductance value of the receiving coil according to the voltage value and the current value of the receiving coil | ⟶ S320 |

| Determine a deviation between the reference mutual inductance value of the transmitting coil and the reference mutual inductance value of the receiving coil as the reference deviation | ⟶ S330 |

FIG. 7

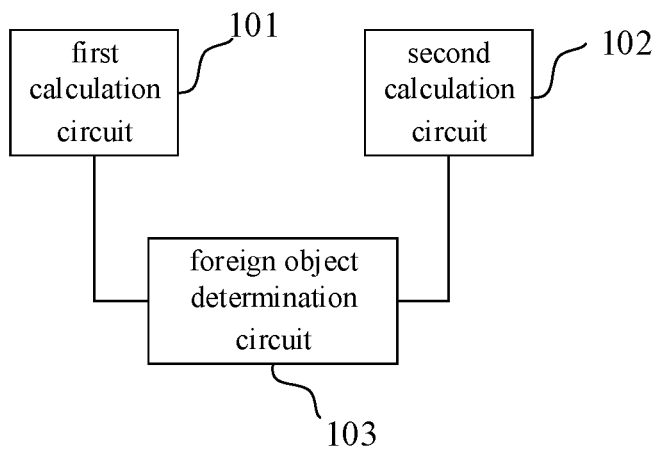

FIG. 8

CHARGING SYSTEM, FOREIGN OBJECT DETECTION METHOD AND COMPONENT, CHARGING CONTROL METHOD AND DEVICE

CROSS-REFERENCE TO RELATED APPLICATIONS

This application is a 35 U.S.C. § 371 national phase application of International Application No. PCT/CN2020/087321 filed Apr. 27, 2020, which claims the benefit of and priority to Chinese Patent Application No. 201910406482.3 titled "CHARGING SYSTEM, FOREIGN OBJECT DETECTION METHOD AND COMPONENT, CHARGING CONTROL METHOD AND DEVICE," and filed on May 16, 2019, the entire contents of which are incorporated by reference in their entireties herein.

TECHNICAL FIELD

Embodiments of the present disclosure generally relate to a conductor foreign object detection method for a wireless charging system, a wireless charging control method for a wireless charging system, a conductor foreign object detection component for a wireless charging system, a control device for a wireless charging system, and a wireless charging system.

BACKGROUND

Wireless charging uses the coupling between a transmitting coil and a receiving coil to achieve the purpose of energy transfer. If there is a metal foreign object between the transmitting coil and the receiving coil, the metal foreign object will result in eddy current in the changing magnetic field and the metal foreign object will be heated up, which will cause safety hazards.

SUMMARY

Embodiments of the present disclosure provide a conductor foreign object detection method for a wireless charging system, a wireless charging control method for a wireless charging system, a conductor foreign object detection component for a wireless charging system, a control device for a wireless charging system, and a wireless charging system.

According to a first aspect of the present disclosure, there is provided a conductor foreign object detection method for a wireless charging system, the wireless charging system including a receiving coil and a transmitting coil; the conductor foreign object detection method including:
receiving a voltage value and a current value of the transmitting coil, and determining a mutual inductance value of the transmitting coil according to the voltage value and the current value of the transmitting coil;
receiving a voltage value and a current value of the receiving coil, and determining a mutual inductance value of the receiving coil according to the voltage value and the current value of the receiving coil; and
determining whether there is a conductor foreign object between the receiving coil and the transmitting coil according to the mutual inductance value of the transmitting coil and the mutual inductance value of the receiving coil.

According to an exemplary embodiment of the preset disclosure, the mutual inductance value of the transmitting coil is determined according to the voltage value and the current value of the transmitting coil based on the following equation:

$$M_1 = L_1 - \frac{1}{jw}\left(\frac{u_1}{i_1} + \frac{1}{jwC_1} - R_1\right)$$

wherein $M_1$ is the mutual inductance value of the transmitting coil; $L_1$ is an inductance value of the transmitting coil; $u_1$ is the voltage value of the transmitting coil; $i_1$ is the current value of the transmitting coil; $C_1$ is a capacitance value of the transmitting coil; $R_1$ is a resistance value of the transmitting coil; and $w$ is a current angular frequency;

wherein the mutual inductance value of the receiving coil is determined according to the voltage value and the current value of the receiving coil based on the following equation:

$$M_2 = L_2 - \frac{1}{jw}\left(\frac{u_2}{i_2} + \frac{1}{jwC_2} - R_2\right)$$

wherein $M_2$ is the mutual inductance value of the receiving coil; $L_2$ is an inductance value of the receiving coil; $u_2$ is the voltage value of the receiving coil; $i_2$ is the current value of the receiving coil; $C_2$ is a capacitance value of the receiving coil; and $R_2$ is a resistance value of the receiving coil.

According to an exemplary embodiment of the preset disclosure, determining whether there is a conductor foreign object between the receiving coil and the transmitting coil according to the mutual inductance value of the transmitting coil and the mutual inductance value of the receiving coil, includes:
determining a deviation between the mutual inductance value of the transmitting coil and the mutual inductance value of the receiving coil as a mutual inductance deviation;
comparing the mutual inductance deviation and a reference deviation; and
when the mutual inductance deviation is greater than the reference deviation, determining that there is the conductor foreign object between the receiving coil and the transmitting coil.

According to an exemplary embodiment of the preset disclosure, determining the deviation between the mutual inductance value of the transmitting coil and the mutual inductance value of the receiving coil includes:
determining an absolute value of a difference between the mutual inductance value of the transmitting coil and the mutual inductance value of the receiving coil as the mutual inductance deviation.

According to an exemplary embodiment of the preset disclosure, the conductor foreign object detection method further includes:
under a reference condition, receiving the voltage value and the current value of the transmitting coil, and determining a reference mutual inductance value of the transmitting coil according to the voltage value and the current value of the transmitting coil;
under the reference condition, receiving the voltage value and the current value of the receiving coil, and determining a reference mutual inductance value of the receiving coil according to the voltage value and the current value of the receiving coil; and determining a deviation between the reference mutual inductance value of the transmitting coil and the reference mutual inductance value of the receiving coil as the reference deviation;

wherein the reference condition is that there is no conductor foreign object between the receiving coil and the transmitting coil.

According to an exemplary embodiment of the preset disclosure, determining the deviation between the reference mutual inductance value of the transmitting coil and the reference mutual inductance value of the receiving coil includes:

determining an absolute value of a difference between the reference mutual inductance value of the transmitting coil and the reference mutual inductance value of the receiving coil as the reference deviation.

According to a second aspect, there is provided a wireless charging control method for a wireless charging system, including the conductor foreign object detection method described above; the wireless charging control method further including:

when it is determined that there is the conductor foreign object between the receiving coil and the transmitting coil, stopping wireless charging.

According to a third aspect, there is provided a conductor foreign object detection component for a wireless charging system, the wireless charging system including a receiving coil and a transmitting coil; the conductor foreign object detection component including:

a first calculation circuit configured to receive a voltage value and a current value of the transmitting coil, and determine a mutual inductance value of the transmitting coil according to the voltage value and the current value of the transmitting coil;

a second calculation circuit configured to receive a voltage value and a current value of the receiving coil, and determine a mutual inductance value of the receiving coil according to the voltage value and the current value of the receiving coil; and a foreign object determination circuit connected to the first calculation circuit and the second calculation circuit and configured to receive the mutual inductance value of the transmitting coil and the mutual inductance value of the receiving coil and determine whether there is a conductor foreign object between the receiving coil and the transmitting coil according to the mutual inductance value of the transmitting coil and the mutual inductance value of the receiving coil.

According to an exemplary embodiment of the preset disclosure, first calculation circuit is configured to calculate the mutual inductance value of the transmitting coil based on the following equation:

$$M_1 = L_1 - \frac{1}{jw}\left(\frac{u_1}{i_1} + \frac{1}{jwC_1} - R_1\right)$$

wherein $M_1$ is the mutual inductance value of the transmitting coil; $L_1$ is an inductance value of the transmitting coil; $u_1$ is the voltage value of the transmitting coil; $i_1$ is the current value of the transmitting coil; $C_1$ is a capacitance value of the transmitting coil; $R_1$ is a resistance value of the transmitting coil; and w is a current angular frequency;

wherein the second calculation circuit is configured to calculate the mutual inductance value of the receiving coil based on the following equation:

$$M_2 = L_2 - \frac{1}{jw}\left(\frac{u_2}{i_2} + \frac{1}{jwC_2} - R_2\right)$$

wherein $M_2$ is the mutual inductance value of the receiving coil; $L_2$ is an inductance value of the receiving coil; $u_2$ is the voltage value of the receiving coil; $i_2$ is the current value of the receiving coil; $C_2$ is a capacitance value of the receiving coil; and $R_2$ is a resistance value of the receiving coil.

According to an exemplary embodiment of the preset disclosure, the foreign object determination circuit includes:

a deviation determination sub-circuit connected to the first calculation circuit and the second calculation circuit and configured to receive the mutual inductance value of the transmitting coil and the mutual inductance value of the receiving coil, and determine a deviation between the mutual inductance value of the transmitting coil and the mutual inductance value of the receiving coil as a mutual inductance deviation;

a comparison sub-circuit connected to the deviation determination sub-circuit and configured to receive the mutual inductance deviation and compare the mutual inductance deviation and a reference deviation; and a determination sub-circuit connected to the comparison sub-circuit and configured to receive a comparison result between the mutual inductance deviation and the reference deviation, and when the mutual inductance deviation is greater than the reference deviation, determine that there is the conductor foreign object between the receiving coil and the transmitting coil.

According to an exemplary embodiment of the preset disclosure, the deviation determination circuit is configured o:

determine an absolute value of a difference between the mutual inductance value of the transmitting coil and the mutual inductance value of the receiving coil as the mutual inductance deviation.

According to an exemplary embodiment of the preset disclosure, the conductor foreign object detection component further includes:

a reference deviation determination circuit connected to the first calculation circuit and the second calculation circuit, and configured to receive a reference mutual inductance value of the transmitting coil and a reference mutual inductance value of the receiving coil, and determine a deviation between the reference mutual inductance value of the transmitting coil and the reference mutual inductance value of the receiving coil as the reference deviation;

wherein the reference mutual inductance value of the transmitting coil is obtained by the following:

under a reference condition, the first calculation circuit receives the voltage value and the current value of the transmitting coil and calculates the reference mutual inductance value of the transmitting coil according to the voltage value and the current value of the transmitting coil;

wherein the reference mutual inductance value of the receiving coil is obtained by the following:

under the reference condition, the second calculation circuit receives the voltage value and the current value of the receiving coil, and calculates a reference mutual inductance value of the receiving coil according to the voltage value and the current value of the receiving coil; and wherein the reference condition is that there is no conductor foreign object between the receiving coil and the transmitting coil.

According to an exemplary embodiment of the preset disclosure, the reference deviation determination circuit is configured to:

determine an absolute value of a difference between the reference mutual inductance value of the transmitting coil and the reference mutual inductance value of the receiving coil as the reference deviation.

According to a fourth aspect of the present disclosure, there is provided a wireless charging control device for a wireless charging system, including:

the conductor foreign object detection component described above; and a control component connected to the conductor foreign object detection component, and configured to receive a determination result from the conductor foreign object detection component and stop wireless charging when there is the conductor foreign object between the receiving coil and the transmitting coil.

According to a fifth aspect of the present disclosure, there is provided a wireless charging system including the wireless charging control device for a wireless charging system described above.

BRIEF DESCRIPTION OF THE DRAWINGS

The above and other features and advantages of the present disclosure will become more apparent from the description of the exemplary embodiments with reference to the accompanying drawings.

FIG. 6 is a schematic diagram showing the principle of mutual inductance when there is a conductor foreign object between the receiving coil and the transmitting coil under an ideal condition.

FIG. 7 is a schematic diagram showing processes for determining a reference deviation according to an embodiment of the present disclosure.

FIG. 8 is a schematic structural diagram of a conductor foreign object detection component for a wireless charging system according to an embodiment of the present disclosure.

DETAILED DESCRIPTION

Figure 1:
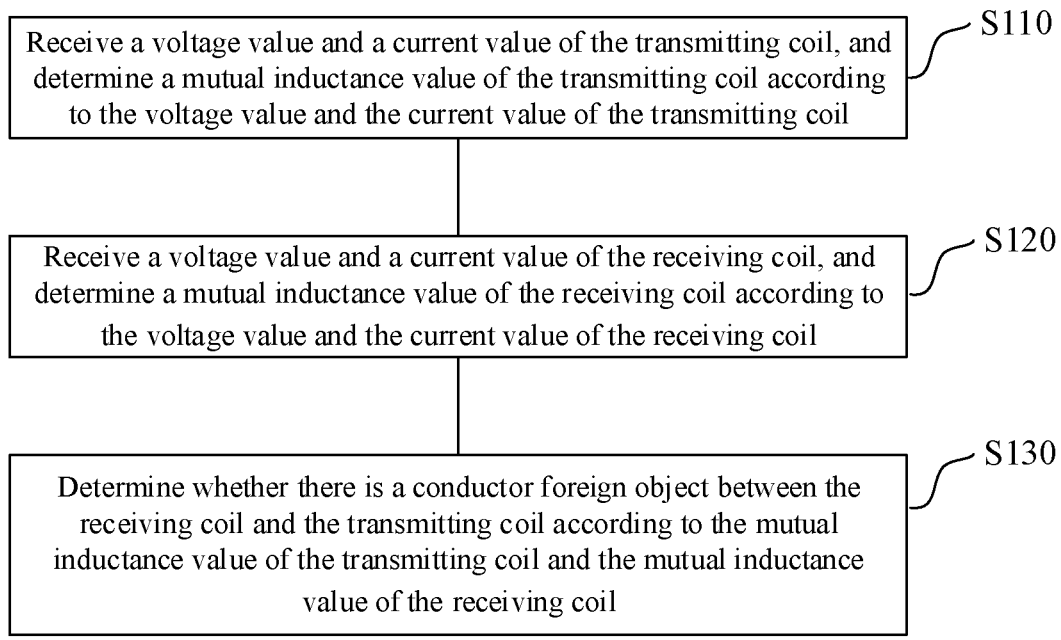
FIG. 1 is a schematic flowchart of conductor foreign object detection method for a wireless charging system according to an embodiment of the present disclosure.

Example embodiments will now be described more fully with reference to the drawings. However, the example embodiments can be implemented in various forms, and should not be construed as being limited to the examples set forth herein; on the contrary, the provision of these embodiments makes the present disclosure more comprehensive and complete, and fully conveys the concept of the example embodiments to those skilled in the art. The described features, structures or characteristics may be combined in one or more embodiments in any suitable manner. In the following description, many specific details are provided to give a full understanding of embodiments of the present disclosure.

The terms "a", "an", and "the" are used to indicate the presence of one or more elements/components/etc.; the terms "include" and "have" are used to indicate open-ended inclusion and mean that, in addition to the listed elements/components/etc., there may be additional elements/components/etc. The terms "first" and "second" and the like are used to identify different objects and should not be construed as constituting any limitation on the number of the objects.

In recent years, wireless charging technology has been widely applied. According to related arts, in wireless charging based on the quality factor (Qi) standard, a metal foreign object detection method is divided into two stages. The first stage is a quality factor detection procedure. This procedure occurs before the power transmission starts. After a transmitting coil detects a receiving coil, the current quality factor is first detected. If the quality factor is greater than a threshold, it is determined that there is a metal foreign object and an alarm is issued. The second stage is a power loss detection procedure. This procedure occurs during the power transmission procedure. A difference between the power sent by the transmitting coil and the power received by the receiving coil is determined. If the power difference is greater than a threshold, it is determined that there is a metal foreign object in the power transmission procedure. This scheme takes into account that the power received by the receiving coil will be lost in the air, and accordingly linear compensation will be performed on the basis of the power received by the receiving coil. The power received by the receiving coil can be linearly compensated according to a load relationship, and will not change after setting. If the distance between the transmitting coil and the receiving coil increases and the power loss exceeds the threshold, it will be mistakenly determined that there is a metal foreign object between the transmitting coil and the receiving coil, and thus the power cannot be transmitted normally.

Generally, in the wireless charging procedure, the difference between the power transmitted by the transmitting coil and the power received by the receiving coil can be used to determine whether there is a metal foreign object. Since the power loss increases with the increase of the transmitted power, it is needed to perform error calibration on the power received by the receiving coil; however, the effect of error calibration is poor, resulting in that when the distance between the transmitting coil and the receiving coil become large, it is easy to lead to mistakes (i.e., the wireless charging system will mistakenly determine that there is a foreign object). Consequently, the user experience is poor.

Embodiments of the present disclosure provide a conductor foreign object detection method for a wireless charging system. The wireless charging system includes a receiving coil and a transmitting coil. As shown in FIG. 1, the conductor foreign object detection method includes the following steps:

In step S110, a voltage value and a current value of the transmitting coil are received, and a mutual inductance value of the transmitting coil is determined according to the voltage value and the current value of the transmitting coil.

In step S120, a voltage value and a current value of the receiving coil are received, and a mutual inductance value of the receiving coil is determined according to the voltage value and the current value of the receiving coil.

In step S130, whether there is a conductor foreign object between the receiving coil and the transmitting coil is determined according to the mutual inductance value of the transmitting coil and the mutual inductance value of the receiving coil.

In the conductor foreign object detection method for the wireless charging system according to embodiments of the present disclosure, the mutual inductance value of the transmitting coil and the mutual inductance value of the receiving coil are used as indicators to determine whether there is a foreign object. Thus, embodiments of the present disclosure can address the problem of mistakes in determination in related art caused by the correlation between power loss and distance. The accuracy of the recognition of foreign conductors is increased, and accordingly the wireless charging system can more accurately determine whether there are foreign conductors over a larger distance, thereby increasing the charging distance of the wireless charging system.

The steps of the conductor foreign object detection method for the wireless charging system provided according to embodiments of the present disclosure will be described in detail below with reference to the accompanying drawings.

Figure 2:
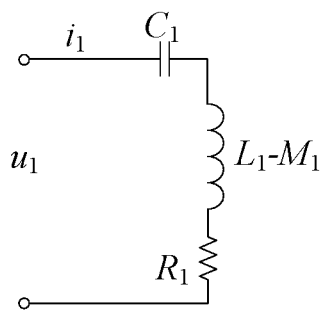
FIG. 2 is a schematic diagram of an equivalent circuit model of a transmitting coil according to an embodiment of the present disclosure.

FIG. 2 is an equivalent circuit model of the transmitting coil TX. According to FIG. 2, it can be seen that:

$$u_1 = i_1 * \left( R_1 + jw(L_1 - M_1) - \frac{1}{jwC_1} \right)$$

where $M_1$ is the mutual inductance value of the transmitting coil TX; $L_1$ is the inductance value of the transmitting coil TX; $u_1$ is the voltage value of the transmitting coil TX; $i_1$ is the current value of the transmitting coil TX; $C_1$ is the capacitance value of the transmitting coil TX; $R_1$ is the resistance value of transmitting coil TX; w is the current angular frequency.

Therefore, the method for determining the mutual inductance value of the transmitting coil TX according to the voltage value and the current value of the transmitting coil TX can be based on the following equation:

$$M_1 = L_1 - \frac{1}{jw}\left( \frac{u_1}{i_1} + \frac{1}{jwC_1} - R_1 \right)$$

Figure 3:
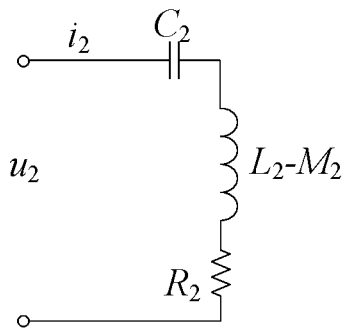
FIG. 3 is a schematic diagram of an equivalent circuit model of a receiving coil according to an embodiment of the present disclosure.

FIG. 3 shows the equivalent circuit model of the receiving coil RX. According to FIG. 3, it can be seen that:

$$u_2 = i_2 * \left( R_2 + jw(L_2 - M_2) - \frac{1}{jwC_2} \right)$$

where $M_2$ is the mutual inductance value of the receiving coil RX; $L_2$ is the inductance value of the receiving coil RX; $u_2$ is the voltage value of the receiving coil RX; $i_2$ is the current value of the receiving coil RX; $C_2$ is the capacitance value of the receiving coil RX; $R_2$ is the resistance value of receiving coil RX.

The method of determining the mutual inductance value of the receiving coil RX according to the voltage value and the current value of the receiving coil RX may be based on the following equation:

$$M_2 = L_2 - \frac{1}{jw}\left( \frac{u_2}{i_2} + \frac{1}{jwC_2} - R_2 \right)$$

Figure 4:
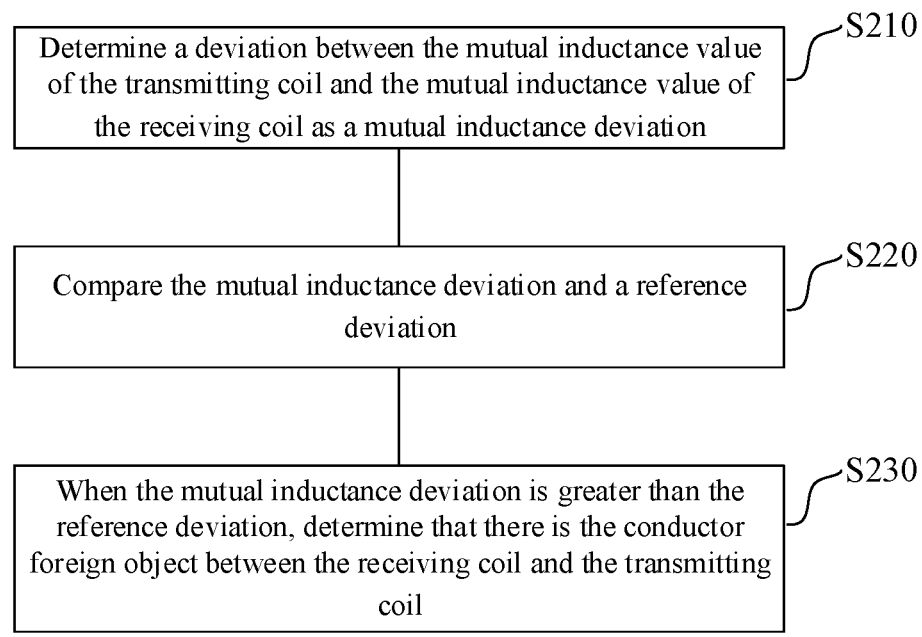
FIG. 4 is a schematic diagram showing processes for determining whether there is a conductor foreign object according to an embodiment of the present disclosure.

In an embodiment, in step S130, as shown in FIG. 4, the following method can be used to determine whether there is a conductive foreign object between the receiving coil and the transmitting coil:

In step S210, a deviation between the mutual inductance value of the transmitting coil and the mutual inductance value of the receiving coil is determined as a mutual inductance deviation.

In step S220, the mutual inductance deviation is compared with a reference deviation.

In step S230, when the mutual inductance deviation is greater than the reference deviation, it is determined that there is the conductor foreign object between the receiving coil and the transmitting coil.

In this way, the conductor foreign object detection method according to embodiments of the present disclosure uses the deviation between the mutual inductance value of the transmitting coil and the mutual inductance value of the receiving coil as an index for determining whether there is a foreign object. This deviation is not related to distance, and thus the conductor foreign object detection method can address the problem of mistakes in determination regarding whether there is foreign object in related art caused by the correlation between power loss and distance. The accuracy of the recognition of foreign conductors is increased, and accordingly the wireless charging system can more accurately determine whether there are foreign conductors over a larger distance, thereby increasing the charging distance of the wireless charging system.

Figure 5:
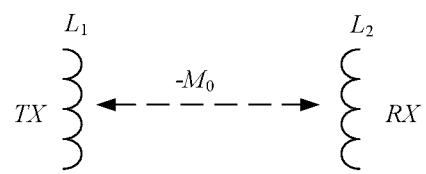
FIG. 5 is a schematic diagram showing the principle of mutual inductance when there is no conductor foreign object between the receiving coil and the transmitting coil under an ideal condition.

FIG. 5 is a schematic diagram showing the principle of mutual inductance when there is no conductor foreign object between the receiving coil RX and the transmitting coil TX under an ideal condition. The mutual inductance value between the receiving coil RX and the transmitting coil TX is $M_0$. Since the transmitting coil TX only has mutual inductance with the receiving coil RX, the mutual inductance value of the transmitting coil TX is $M_1=M_0$. Since the receiving coil RX only has mutual inductance with the transmitting coil TX, the mutual inductance value of the receiving coil RX is $M_2=M_0$. Therefore, if there is no conductor foreign object between the receiving coil RX and the transmitting coil TX, $M_2=M_1$ under the ideal condition.

FIG. 6 is a schematic diagram showing the mutual inductance principle when there is a conductor foreign object X between the receiving coil RX and the transmitting coil TX under an ideal condition. According to FIG. 6, the mutual inductance value between the receiving coil RX and the transmitting coil TX is $M_0$, the mutual inductance value between the transmitting coil TX and the foreign conductor X is $M_{1X}$, and the mutual inductance value between the receiving coil RX and the foreign conductor X is $M_{2X}$. Therefore, the mutual inductance value of the transmitting coil TX is $M_1=M_0+M_{1X}$; the mutual inductance value of the receiving coil RX is $M_2=M_0+M_{2X}$. Since Mix and Max are almost impossible to be the same, $M_{1X} \neq M_{2X}$ under the ideal condition, then $M_2 \neq M_1$. Therefore, if there is a foreign conductor between the receiving coil RX and the transmitting coil TX, $M_2 \neq M_1$ under the ideal condition.

Therefore, according to FIGS. 5 and 6, it can be seen that under the ideal condition, by determining whether $M_2$ and $M_1$ are equal, whether there is a conductor foreign object between the transmitting coil TX and the receiving coil RX can be determined. However, in actual wireless charging procedure, even if there are no conductor foreign objects between the transmitting coil TX and the receiving coil RX, the receiving coil RX and the transmitting coil TX may be interfered by the surrounding environment, resulting in $M_2 \neq M_1$.

In order to address the interference of the surrounding environment, the present disclosure may set a reference deviation $\Delta_{st}$. The deviation between $M_1$ and $M_2$ is taken as the mutual inductance deviation $\Delta_{12}$. If the mutual inductance deviation is greater than the reference deviation $\Delta_{st}$, it can be judged that there is a foreign conductor between the receiving coil RX and the transmitting coil TX. In one embodiment, if the mutual inductance deviation $\Delta_{12}$ is not greater than the reference deviation $\Delta_{st}$, it is determined that the mutual inductance deviation $\Delta_{12}$ originates from the interference of the surrounding environment. Therefore, it can be determined that there is no conductor foreign object between the receiving coil RX and the transmitting coil TX.

In an embodiment, the absolute value of the difference between the mutual inductance value of the transmitting coil TX and the mutual inductance value of the receiving coil RX can be determined as the mutual inductance deviation $\Delta_{12}$, that is, $\Delta_{12}=|M_1-M_2|$.

The reference deviation $\Delta_{st}$ can be set according to the performance of the wireless charging system or the surrounding environment. In an embodiment, the reference deviation $\Delta_{st}$ may be determined under a reference condition, where the reference condition is that there is no conductor foreign object between the receiving coil RX and the transmitting coil TX. For example, as shown in FIG. 7, the method for determining the reference deviation $\Delta_{st}$ includes the following steps:

In step S310, under a reference condition, the voltage value $u_t$ and the current value $i_t$ of the transmitting coil TX are received, and the reference mutual inductance value $M_t$ of the transmitting coil TX is determined according to the voltage value $u_t$ and the current value $i_t$ of the transmitting coil TX based on the following equation:

$$M_t = L_1 - \frac{1}{jw}\left(\frac{u_t}{i_t} + \frac{1}{jwC_1} - R_1\right)$$

In step S320, under the reference condition, the voltage value $u_r$ and the current value $i_r$ of the receiving coil RX are received, and the reference mutual inductance value $M_r$ of the receiving coil RX is determined according to the voltage value $u_r$ and the current value $i_r$ of the receiving coil RX based on the following equation:

$$M_r = L_1 - \frac{1}{jw}\left(\frac{u_r}{i_r} + \frac{1}{jwC_1} - R_1\right)$$

In step S330, the deviation between the reference mutual inductance value $M_t$ of the transmitting coil TX and the reference mutual inductance value $M_r$ of the receiving coil RX is determined as the reference deviation $\Delta_{st}$.

According to embodiments, under the reference condition, the distance between the receiving coil RX and the transmitting coil TX may be a predetermined distance. The predetermined distance can be determined according to the distance between the receiving coil RX and the transmitting coil TX when the wireless charging system is in normal use, or can be determined according to other agreed rules, which is not specifically limited in the present disclosure. In one embodiment, under the reference condition, the distance between the receiving coil RX and the transmitting coil TX is 1 to 3 mm.

According to embodiments, the absolute value of the difference between the reference mutual inductance value $M_t$ of the transmitting coil TX and the reference mutual inductance value $M_r$ of the receiving coil RX can be determined as the reference deviation $\Delta_{st}$, that is, $\Delta_{st}=|M_t-M_r|$.

In an embodiment, the reference deviation $\Delta_{st}$ may be reset. For example, when the wireless charging system is applied in a new environment, a user can re-determine the reference deviation $\Delta_{st}$ according to the method described in step S210 to step S230, so that the reference deviation $\Delta_{st}$ can accurately reflect the influence of the surrounding environment on the wireless charging system.

In an embodiment, the conductor foreign object detection method provided by the present disclosure is used to detect a conductor foreign object during wireless charging.

In an embodiment, the conductor foreign object in the present disclosure may be various conductive materials such as metals, conductive solutions, conductive plastics, and graphite.

It should be noted that although various steps of the methods in the present disclosure are described in a specific order in the drawings, this does not require or imply that these steps must be performed in the specific order, or that all the steps shown must be performed to achieve the desired results. For example, the order of step S110 and step S120 can be interchanged, or the two steps can be executed simultaneously; for another example, the order of step S310 and step S320 can be interchanged, or the two steps can be executed simultaneously. Additionally or alternatively, certain steps may be omitted, multiple steps may be combined into one step, and/or one step may be decomposed into multiple steps, etc., all such modification should be regarded as part of the present disclosure.

The present disclosure also provides a wireless charging control method for a wireless charging system. The wireless charging control method for the wireless charging system includes the conductor foreign object detection method described in the foregoing embodiments. The wireless charging control method further includes:
when it is determined that there is a conductor foreign object between the receiving coil and the transmitting coil, stopping wireless charging.

In this way, when it is determined that there is a conductor foreign object between the receiving coil and the transmitting coil, the wireless charging system can stop the wireless charging. Thus, the method can avoid that the conductor foreign object is heated up due to eddy current in the changing magnetic field during the wireless charging, and thereby reduce the safety hazards.

The wireless charging control method for the wireless charging system of the present disclosure uses the same method for detecting foreign objects as described above, and has the same technical effects, and repeated descriptions are omitted here.

The present disclosure also provides a conductor foreign object detection component 100 for a wireless charging system. The wireless charging system includes a receiving coil RX and a transmitting coil TX. As shown in FIG. 8, the conductor foreign object detection component 100 includes a first calculation circuit 101, a second calculation circuit 102 and a foreign object determination circuit 103.

The first calculation circuit 101 is configured to receive the voltage value and the current value of the transmitting coil TX, and determine the mutual inductance value of the transmitting coil TX according to the voltage value and the current value of the transmitting coil TX.

The second calculation circuit 102 is configured to receive the voltage value and the current value of the receiving coil RX, and determine the mutual inductance value of the receiving coil RX according to the voltage value and the current value of the receiving coil RX.

The foreign object judgment circuit 103 is connected to the first calculation circuit 101 and the second calculation circuit 102, and is configured to receive the mutual inductance value of the transmitting coil TX and the mutual inductance value of the receiving coil RX, and determine whether there is a conductor foreign object between the receiving coil TX and the transmitting coil RX according to the mutual inductance value of the transmitting coil TX and the mutual inductance value of the receiving coil RX.

In the conductor foreign object detection component 100 for the wireless charging system according to embodiments of the present disclosure, the mutual inductance value of the transmitting coil TX and the mutual inductance value of the receiving coil RX are used as indicators to determine whether there is a foreign conductor. Thus, embodiments of the present disclosure can address the problem of mistakes in determination regarding whether there is a foreign conductor in related art caused by the correlation between power loss and distance. The accuracy of the recognition of foreign conductors is increased, and accordingly the wireless charging system can more accurately determine whether there are foreign conductors over a larger distance, thereby increasing the charging distance of the wireless charging system.

The first calculation circuit 101 may be a PLC (Programmable Logic Controller), MCU (Micro Control Unit), CPU (Central Processing Unit), or other types of integrated circuits, or a part of an integrated circuit, and embodiments of the present disclosure do not impose specific limitations on this. In an embodiment, the first calculation circuit 101 is configured to calculate the mutual inductance value of the transmitting coil TX according to the following equation:

$$M_1 = L_1 - \frac{1}{jw}\left(\frac{u_1}{i_1} + \frac{1}{jwC_1} - R_1\right)$$

wherein $M_1$ is the mutual inductance value of the transmitting coil TX; $L_1$ is an inductance value of the transmitting coil TX; $u_1$ is the voltage value of the transmitting coil TX; $i_1$ is the current value of the transmitting coil TX; $C_1$ is a capacitance value of the transmitting coil TX; $R_1$ is a resistance value of the transmitting coil TX; and w is a current angular frequency.

The second calculation circuit 102 may be a PLC (Programmable Logic Controller), MCU (Micro Control Unit), CPU (Central Processing Unit), or other types of integrated circuits, or part of an integrated circuit, and embodiments of the present disclosure do not impose specific limitation on this. In an embodiment, the second calculation circuit 102 may be configured to calculate the mutual inductance value of the receiving coil RX according to the following equation:

$$M_2 = L_2 - \frac{1}{jw}\left(\frac{u_2}{i_2} + \frac{1}{jwC_2} - R_2\right)$$

wherein $M_2$ is the mutual inductance value of the receiving coil RX; $L_2$ is an inductance value of the receiving coil RX; $u_2$ is the voltage value of the receiving coil RX; $i_2$ is the current value of the receiving coil RX; $C_2$ is a capacitance value of the receiving coil RX; and $R_2$ is a resistance value of the receiving coil RX.

In an embodiment, the foreign object determination circuit 103 is configured to determine the absolute value of the difference between the mutual inductance value of the transmitting coil TX and the mutual inductance value of the receiving coil RX as the mutual inductance deviation.

Figure 9:
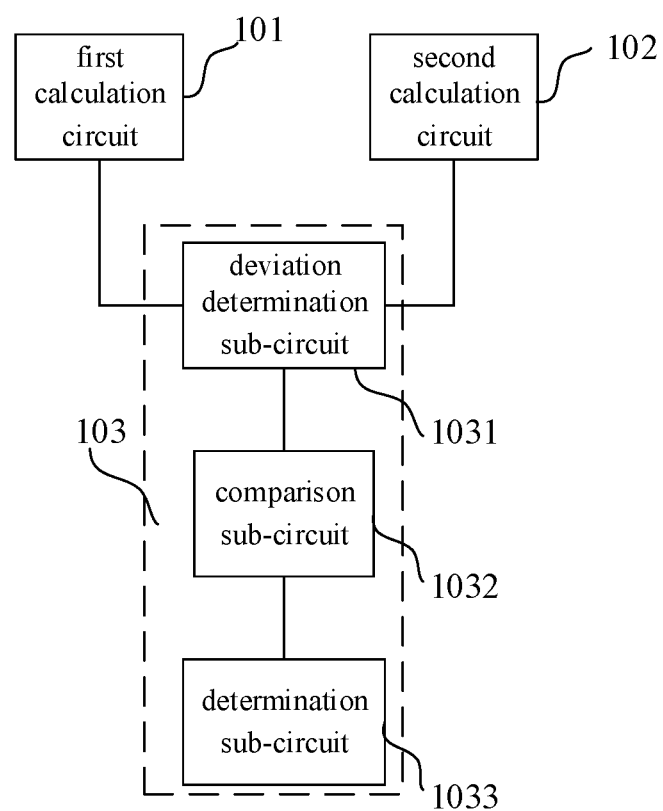
FIG. 9 is a schematic structural diagram of a conductor foreign object detection component for a wireless charging system according to an embodiment of the present disclosure.

In an embodiment, as shown in FIG. 9, the foreign object determination circuit 103 may include a deviation determination sub-circuit 1031, a comparison sub-circuit 1032 and a determination sub-circuit 1033.

The deviation determining sub-circuit 1031 is connected to the first calculation circuit 101 and the second calculation circuit 102, and is configured to receive the mutual inductance value of the transmitting coil TX and the mutual inductance value of the receiving coil RX, and determine the deviation between the mutual inductance value of the transmitting coil TX and the mutual inductance value of the receiving coil RX as the mutual inductance deviation. The comparison sub-circuit 1032 is connected to the deviation determination sub-circuit 1031, and is configured to receive the mutual inductance deviation and compare the mutual inductance deviation and a reference deviation. The determination sub-circuit 1033 is connected to the comparison sub-circuit 1032, and is configured to receive a comparison result between the mutual inductance deviation and the reference deviation, and when the mutual inductance deviation is greater than the reference deviation, determine that there is the conductor foreign object between the receiving coil and the transmitting coil.

Any one of the deviation determination sub-circuit 1031, the comparison sub-circuit 1032, and the determination sub-circuit 1033 can be PLC (programmable logic controller), MCU (micro control unit), CPU (central processing unit) or other types integrated circuit, or a part of an integrated circuit, and embodiments of the present disclosure do not impose specific limitation on this.

In the foreign object determination circuit 103 of the wireless charging system of the present disclosure, the deviation between the mutual inductance value of the transmitting coil TX and the mutual inductance value of the receiving coil RX is used as an index for determining whether there is a foreign conductor. This deviation between the mutual inductance values is not related to distance, and thus the present disclosure can address the problem of mistakes in determination regarding whether there is foreign object in related art caused by the correlation between power loss and distance. The accuracy of the recognition of foreign conductors is increased, and accordingly the wireless charging system can more accurately determine whether there are foreign conductors over a larger distance, thereby increasing the charging distance of the wireless charging system.

Figure 10:
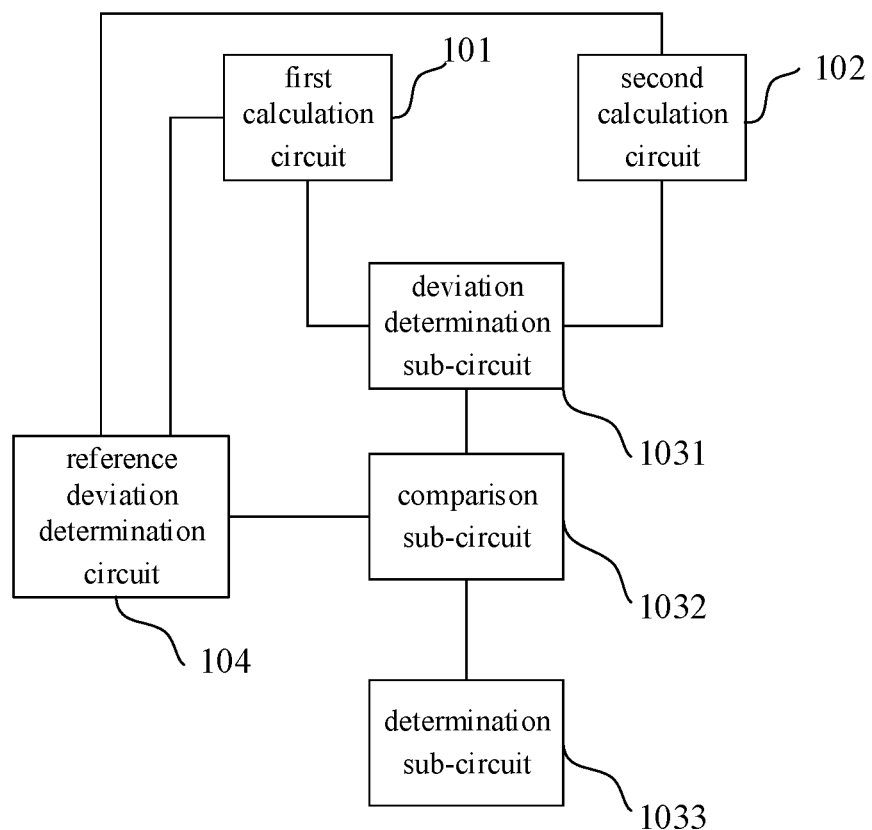
FIG. 10 is a schematic structural diagram of a conductor foreign object detection component for a wireless charging system according to an embodiment of the present disclosure.

In an embodiment, as shown in FIG. 10, the conductor foreign object detection component 100 further includes:

a reference deviation determination circuit 104 connected to the first calculation circuit 101 and the second calculation circuit 102, and configured to receive the reference mutual inductance value of the transmitting coil TX and the reference mutual inductance value of the receiving coil RX, and determine the deviation between the reference mutual inductance value of the transmitting coil TX and the reference mutual inductance value of the receiving coil RX as the reference deviation.

The reference mutual inductance value of the transmitting coil TX can be obtained by the following method: under a reference condition, the first calculation circuit 101 receives the voltage value and the current value of the transmitting coil TX, and calculates the reference mutual inductance value of the transmitting coil TX according to the voltage value and the current value of the transmitting coil TX.

The reference mutual inductance value of the receiving coil RX can be obtained by the following method: under the reference condition, the second calculation circuit 102 receives the voltage value and the current value of the receiving coil RX, and calculates the reference mutual inductance value of the receiving coil RX according to the voltage value and the current value of the receiving coil RX.

The reference condition may be that there is no conductor foreign object between the receiving coil RX and the transmitting coil TX.

In an embodiment, the reference deviation determination circuit 104 is configured to determine the absolute value of the difference between the reference mutual inductance value of the transmitting coil TX and the reference mutual inductance value of the receiving coil RX as the reference deviation.

In an embodiment, the determining sub-circuit 1033 is also configured to, when the mutual inductance deviation is not greater than the reference deviation, determine that there is no conductor foreign object between the receiving coil RX and the transmitting coil TX.

The specific details and principles of the circuits of the conductor foreign object detection component 100 of the present disclosure have been described in detail in the embodiments of the conductor foreign object detection component 100, and repeated descriptions will be omitted here. It should be noted that although several circuits of the conductor foreign object detection component 100 are mentioned above, such division is not mandatory. In fact, according to the embodiments of the present disclosure, the features and functions of two or more circuits described above may be embodied in one circuit. Conversely, the features and functions of a circuit described above can be further divided into multiple circuits.

The present disclosure also provides a control device for a wireless charging system, which includes any one of the conductor foreign object detection components described in the above embodiments. The control device further includes a control component.

The control component is connected to the conductor foreign object detection component, and is configured to receive the determination result of the conductor foreign object detection component, and control the wireless charging system to stop wireless charging when there is a conductor foreign object between the receiving coil and the transmitting coil.

In this way, when the conductor foreign object detection component determines that there is a conductor foreign object between the receiving coil RX and the transmitting coil TX, the control component can control the wireless charging system to stop wireless charging. Thus, the control device can avoid that the conductor foreign object is heated up due to eddy current in the changing magnetic field during the wireless charging, and thereby reduce the safety hazards.

The control component can be PLC (Programmable Logic Controller), MCU (Micro Control Unit), CPU (Central Processing Unit) or other types of integrated circuits, or a part of an integrated circuit, and embodiments of the present disclosure do not impose specific limitations on this.

In the wireless charging control device for the wireless charging system of the present disclosure, the component for detecting the conductor foreign object is the same as the conductor foreign object detection component described in the above embodiments, and therefore has the same beneficial effects. Repeated descriptions are omitted here.

The present disclosure also provides a wireless charging system, including the wireless charging control device for the wireless charging system described in the above embodiments. The wireless charging control device for the wireless charging system is the same as that described in the above embodiments, and has the same beneficial effects. Repeated descriptions are omitted here.

It can be understood that the wireless charging system also includes a receiving coil RX and a transmitting coil TX. The receiving coil RX is used to transmit energy; the transmitting coil TX is used to receive energy.

Figure 11:
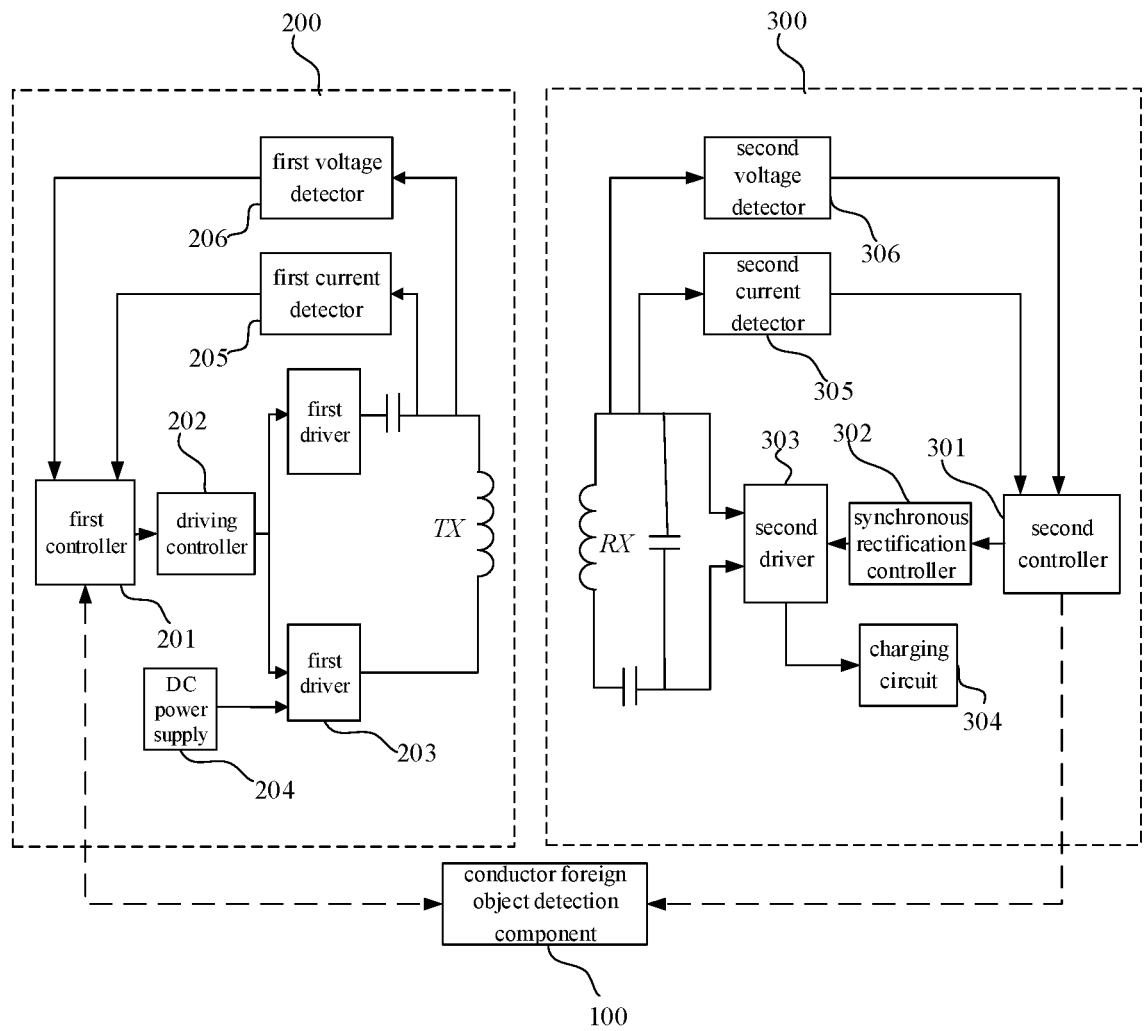
FIG. 11 is a schematic structural diagram of a wireless charging system according to an embodiment of the present disclosure.

Hereinafter, a specific structure of the wireless charging system shown in FIG. 11 is taken as an example to further explain and illustrate the structure and principle of the wireless charging system provided in the present disclosure. As shown in FIG. 11, the wireless charging system may include a charger terminal 200 and a mobile terminal 300.

The charger terminal 200 is provided with a transmitting coil TX, a first controller 201, a driving controller 202, a first driver 203, a DC power supply 204, a first current detector 205, and a first voltage detector 206. The first controller 201 is connected to an input terminal of the driving controller 202, and an output terminal of the driving controller 202 is connected to a control terminal of the first driver 203. The driving controller 202 is used to control the first driver 203 in response to a control signal input by the first controller 201. An output terminal of the first driver 203 is connected to the transmitting coil TX, and an input terminal of the first driver 203 is connected to an output terminal of the DC power supply 204. The first driver 203 is used to convert the DC voltage input from the DC power supply 204 into an AC voltage under the control of the drive controller 202, so as to make the transmitting coil TX generate a changing magnetic field. The first current detector 205 is connected to the transmitting coil TX and the first controller 201 and configured to detect the current on the transmitting coil TX and transmit the current value to the first controller 201. The first voltage detector 206 is connected to the transmitting coil TX and the first controller 201 and configured to detect the voltage across the transmitting coil TX and transmit the voltage value to the first controller 201.

The mobile terminal 300 is provided with a receiving coil RX, a second controller 301, a synchronous rectification controller 302, a second driver 303, a charging circuit 304, a second current detector 305, and a second voltage detector 306. The second controller 301 is connected to an input terminal of the synchronous rectification controller 302, and an output terminal of the synchronous rectification controller 302 is connected to a control terminal of the second driver 303. The synchronous rectification controller 302 is configured to control the second driver 303 in response to a control signal input by the second controller 301. An input terminal of the second driver 303 is connected to the receiving coil RX, and an output terminal of the second driver 303 is connected to the input terminal of the charging circuit 304. The second driver 303 is configured to convert the AC voltage generated by the receiving coil RX in response to the changing magnetic field into a DC voltage under the control of the synchronous rectification controller 302 to supply power to the charging circuit 304. The second current detector 305 is connected to the receiving coil RX and the second controller 301, and configured to detect the current on the receiving coil RX and transmit the current value to the second controller 301. The second voltage detector 306 is connected to the receiving coil RX and the second controller 301, and configured to detect the voltage across the receiving coil RX and transmit the voltage value to the second controller 301.

The conductor foreign object detection component 100 can communicate with the first controller 201 and the second controller 301, and can feed back the determination result to the first controller 201. The first controller 201 can be used as the wireless charging control component of the wireless control device for the wireless charging system. In one embodiment, the conductor foreign object detection component 100 is disposed on the charger terminal 200 or the mobile terminal 300.

In one embodiment, the driving controller 202 is a PWM (Pulse Width Modulation) controller.

It should be understood that the present disclosure is not limited to the detailed structure and arrangement of components proposed in the description. The present disclosure can have other embodiments, and can be implemented and executed in various ways. The alternatives and modifications fall within the scope of the present disclosure. It should be understood that the present disclosure extends to all alternative combinations of two or more individual features mentioned in the description and/or drawings. All of these different combinations constitute multiple alternative aspects of the present disclosure. Embodiments described herein illustrate the exemplary methods for implementing the present disclosure, and will enable those skilled in the art to utilize the present disclosure.

What is claimed is:

1. A conductor foreign object detection method for a wireless charging system, the wireless charging system comprising a receiving coil and a transmitting coil; the conductor foreign object detection method comprising:
   receiving a voltage value and a current value of the transmitting coil, and determining a mutual inductance value of the transmitting coil according to the voltage value and the current value of the transmitting coil;
   receiving a voltage value and a current value of the receiving coil, and determining a mutual inductance value of the receiving coil according to the voltage value and the current value of the receiving coil; and
   determining whether there is a conductor foreign object between the receiving coil and the transmitting coil according to the mutual inductance value of the transmitting coil and the mutual inductance value of the receiving coil.

2. The conductor foreign object detection method according to claim 1, wherein the mutual inductance value of the transmitting coil is determined according to the voltage value and the current value of the transmitting coil based on the following equation:

$$M_1 = L_1 - \frac{1}{jw}\left(\frac{u_1}{i_1} + \frac{1}{jwC_1} - R_1\right)$$

wherein $M_1$ is the mutual inductance value of the transmitting coil; $L_1$ is an inductance value of the transmitting coil; $u_1$ is the voltage value of the transmitting coil; $i_1$ is the current value of the transmitting coil; $C_1$ is a capacitance value of the transmitting coil; $R_1$ is a resistance value of the transmitting coil; and w is a current angular frequency;

wherein the mutual inductance value of the receiving coil is determined according to the voltage value and the current value of the receiving coil based on the following equation:

$$M_2 = L_2 - \frac{1}{jw}\left(\frac{u_2}{i_2} + \frac{1}{jwC_2} - R_2\right)$$

wherein $M_2$ is the mutual inductance value of the receiving coil; $L_2$ is an inductance value of the receiving coil; $u_2$ is the voltage value of the receiving coil; $i_2$ is the current value of the receiving coil; $C_2$ is a capacitance value of the receiving coil; and $R_2$ is a resistance value of the receiving coil.

3. The conductor foreign object detection method according to claim 1, wherein determining whether there is a conductor foreign object between the receiving coil and the transmitting coil according to the mutual inductance value of the transmitting coil and the mutual inductance value of the receiving coil, comprises:
   determining a deviation between the mutual inductance value of the transmitting coil and the mutual inductance value of the receiving coil as a mutual inductance deviation;
   comparing the mutual inductance deviation and a reference deviation; and
   when the mutual inductance deviation is greater than the reference deviation, determining that there is the conductor foreign object between the receiving coil and the transmitting coil.

4. The conductor foreign object detection method according to claim 3, wherein determining the deviation between the mutual inductance value of the transmitting coil and the mutual inductance value of the receiving coil comprises:
   determining an absolute value of a difference between the mutual inductance value of the transmitting coil and the mutual inductance value of the receiving coil as the mutual inductance deviation.

5. The conductor foreign object detection method according to claim 3, further comprising:
   under a reference condition, receiving the voltage value and the current value of the transmitting coil, and determining a reference mutual inductance value of the transmitting coil according to the voltage value and the current value of the transmitting coil;
   under the reference condition, receiving the voltage value and the current value of the receiving coil, and determining a reference mutual inductance value of the receiving coil according to the voltage value and the current value of the receiving coil; and determining a deviation between the reference mutual inductance value of the transmitting coil and the reference mutual inductance value of the receiving coil as the reference deviation;

wherein the reference condition is that there is no conductor foreign object between the receiving coil and the transmitting coil.

6. The conductor foreign object detection method according to claim 5, wherein determining the deviation between the reference mutual inductance value of the transmitting coil and the reference mutual inductance value of the receiving coil comprises:

determining an absolute value of a difference between the reference mutual inductance value of the transmitting coil and the reference mutual inductance value of the receiving coil as the reference deviation.

7. The conductor foreign object detection method according to claim 1, further comprising:

implementing the conductor foreign object detection method during wireless charging in a wireless charging system; and when it is determined that there is the conductor foreign object between the receiving coil and the transmitting coil, stopping the wireless charging.

8. A conductor foreign object detection component for a wireless charging system, the wireless charging system comprising a receiving coil and a transmitting coil;

the conductor foreign object detection component comprising:

a first calculation circuit configured to receive a voltage value and a current value of the transmitting coil, and determine a mutual inductance value of the transmitting coil according to the voltage value and the current value of the transmitting coil;

a second calculation circuit configured to receive a voltage value and a current value of the receiving coil, and determine a mutual inductance value of the receiving coil according to the voltage value and the current value of the receiving coil; and a foreign object determination circuit connected to the first calculation circuit and the second calculation circuit and configured to receive the mutual inductance value of the transmitting coil and the mutual inductance value of the receiving coil and determine whether there is a conductor foreign object between the receiving coil and the transmitting coil according to the mutual inductance value of the transmitting coil and the mutual inductance value of the receiving coil.

9. The conductor foreign object detection component according to claim 8, wherein first calculation circuit is configured to calculate the mutual inductance value of the transmitting coil based on the following equation:

$$M_1 = L_1 - \frac{1}{jw}\left(\frac{u_1}{i_1} + \frac{1}{jwC_1} - R_1\right)$$

wherein $M_1$ is the mutual inductance value of the transmitting coil; $L_1$ is an inductance value of the transmitting coil; $u_1$ is the voltage value of the transmitting coil; $i_1$ is the current value of the transmitting coil; $C_1$ is a capacitance value of the transmitting coil; $R_1$ is a resistance value of the transmitting coil; and w is a current angular frequency;

wherein the second calculation circuit is configured to calculate the mutual inductance value of the receiving coil based on the following equation:

$$M_2 = L_2 - \frac{1}{jw}\left(\frac{u_2}{i_2} + \frac{1}{jwC_2} - R_2\right)$$

wherein $M_2$ is the mutual inductance value of the receiving coil; $L_2$ is an inductance value of the receiving coil; $u_2$ is the voltage value of the receiving coil; $i_2$ is the current value of the receiving coil; $C_2$ is a capacitance value of the receiving coil; and $R_2$ is a resistance value of the receiving coil.

10. The conductor foreign object detection component according to claim 8, wherein the foreign object determination circuit comprises:

a deviation determination sub-circuit connected to the first calculation circuit and the second calculation circuit and configured to receive the mutual inductance value of the transmitting coil and the mutual inductance value of the receiving coil, and determine a deviation between the mutual inductance value of the transmitting coil and the mutual inductance value of the receiving coil as a mutual inductance deviation;

a comparison sub-circuit connected to the deviation determination sub-circuit and configured to receive the mutual inductance deviation and compare the mutual inductance deviation and a reference deviation; and a determination sub-circuit connected to the comparison sub-circuit and configured to receive a comparison result between the mutual inductance deviation and the reference deviation, and when the mutual inductance deviation is greater than the reference deviation, determine that there is the conductor foreign object between the receiving coil and the transmitting coil.

11. The conductor foreign object detection component according to claim 10, wherein the deviation determination sub-circuit is configured to:

determine an absolute value of a difference between the mutual inductance value of the transmitting coil and the mutual inductance value of the receiving coil as the mutual inductance deviation.

12. The conductor foreign object detection component according to claim 10, further comprising:

a reference deviation determination circuit connected to the first calculation circuit and the second calculation circuit, and configured to receive a reference mutual inductance value of the transmitting coil and a reference mutual inductance value of the receiving coil, and determine a deviation between the reference mutual inductance value of the transmitting coil and the reference mutual inductance value of the receiving coil as the reference deviation;

wherein the reference mutual inductance value of the transmitting coil is obtained by the following:

under a reference condition, the first calculation circuit receives the voltage value and the current value of the transmitting coil and calculates the reference mutual inductance value of the transmitting coil according to the voltage value and the current value of the transmitting coil;

wherein the reference mutual inductance value of the receiving coil is obtained by the following:
under the reference condition, the second calculation circuit receives the voltage value and the current value of the receiving coil, and calculates a reference mutual inductance value of the receiving coil according to the voltage value and the current value of the receiving coil; and
wherein the reference condition is that there is no conductor foreign object between the receiving coil and the transmitting coil.

13. The conductor foreign object detection component according to claim 12, wherein the reference deviation determination circuit is configured to:
determine an absolute value of a difference between the reference mutual inductance value of the transmitting coil and the reference mutual inductance value of the receiving coil as the reference deviation.

14. A wireless charging control device for a wireless charging system, comprising:
a conductor foreign object detection component, comprising:
a first calculation circuit configured to receive a voltage value and a current value of a transmitting coil, and determine a mutual inductance value of the transmitting coil according to the voltage value and the current value of the transmitting coil;
a second calculation circuit configured to receive a voltage value and a current value of a receiving coil, and determine a mutual inductance value of the receiving coil according to the voltage value and the current value of the receiving coil; and
a foreign object determination circuit connected to the first calculation circuit and the second calculation circuit and configured to receive the mutual inductance value of the transmitting coil and the mutual inductance value of the receiving coil and determine whether there is a conductor foreign object between the receiving coil and the transmitting coil according to the mutual inductance value of the transmitting coil and the mutual inductance value of the receiving coil; and
a control component connected to the conductor foreign object detection component, and configured to receive a determination result from the conductor foreign object detection component and stop wireless charging when there is the conductor foreign object between the receiving coil and the transmitting coil.

15. The wireless charging control device for a wireless charging system according to claim 14, wherein the wireless charging control device is implemented in a wireless charging system.

\* \* \* \* \*